(12) United States Patent
Van Vleet (10) Patent No.: US 6,502,845 B1
(45) Date of Patent: Jan. 7, 2003

(54) LATERALLY AND LONGITUDINALLY ADJUSTABLE HITCH COUPLING DEVICE

(76) Inventor: Robert D. Van Vleet, 405 12th St., Sidney, NE (US) 69162

( * ) Notice: Subject to any disclaimer, the term of this patent is extended or adjusted under 35 U.S.C. 154(b) by 0 days.

(21) Appl. No.: 09/537,063

(22) Filed: Mar. 28, 2000

(51) Int. Cl.[7] .............................................. B60D 1/155
(52) U.S. Cl. ............................. 280/491.1; 280/491.5; 280/504
(58) Field of Search .............................. 280/477, 478.1, 280/479.2, 479.3, 491.1, 491.2, 491.5, 504, 511

(56) References Cited

U.S. PATENT DOCUMENTS

| | | | |
|---|---|---|---|
| 2,127,689 A | 8/1938 | Johnson | 280/490 |
| 2,127,912 A | 8/1938 | Graham et al. | 280/490 |
| 2,150,269 A | 3/1939 | Dreisbach | 280/490 |
| 2,287,234 A | 6/1942 | Ducharme | 280/490 |
| 3,345,081 A | 10/1967 | Hartwig | 280/490 |
| 3,655,221 A | 4/1972 | Warner | 280/490 |
| 3,708,183 A | 1/1973 | Jones | 280/483 |
| 3,904,226 A | 9/1975 | Smalley | 280/486 |
| 4,056,155 A | 11/1977 | Wahl | 177/145 |
| 4,078,823 A | 3/1978 | McBride | 280/490 |
| 4,148,498 A | 4/1979 | Taylor, Jr. | 280/482 |
| 4,176,854 A | * 12/1979 | Hill et al. | 280/478 |
| 4,215,876 A | 8/1980 | Jacks | 280/483 |
| 4,351,542 A | 9/1982 | Lovell et al. | 280/489 |
| 4,662,647 A | 5/1987 | Calvert | 280/490 |
| 4,746,138 A | 5/1988 | James | 280/487 |
| 4,773,668 A | 9/1988 | Muonro | 280/485 |
| 4,817,978 A | 4/1989 | James | 280/487 |
| 4,978,133 A | 12/1990 | Thorne et al. | 280/484 |
| 5,226,657 A | * 7/1993 | Dolphin | 280/478.1 |
| 5,322,315 A | * 6/1994 | Carsten | 280/479.2 |
| 5,380,030 A | 1/1995 | Gullickson | 280/485 |
| 5,562,298 A | * 10/1996 | Kass et al. | 280/406.2 |
| 5,630,606 A | * 5/1997 | Ryan | 280/479.3 |
| 5,683,094 A | 11/1997 | Gullickson | 280/486 |
| 5,873,595 A | * 2/1999 | Hinte | 280/504 |
| 5,941,550 A | * 8/1999 | Szczypski | 280/479.2 |
| 6,173,984 B1 | * 1/2001 | Kay | 280/495 |

FOREIGN PATENT DOCUMENTS

GB                481968            3/1938

* cited by examiner

Primary Examiner—Avraham Lerner
Assistant Examiner—L. Lum
(74) Attorney, Agent, or Firm—Greer, Burns & Crain, Ltd.

(57) ABSTRACT

A coupling device which is adapted to couple a towed vehicle such as a trailer to a towing vehicle such as a truck. The coupling device is designed to be used with many conventional receiver structures that are mounted to towing vehicles, the receiver structures being of the type that normally receive an elongated square insertion member which carries a ball hitch. The coupling device of the present invention is adapted to be inserted into the same receiver structure and is designed to carry a ball hitch, but the coupling device has many advantages over the conventional receiver insertion member because it is extendable in a longitudinal as well as lateral direction so that the towing vehicle does not have to be perfectly aligned with the hitch of the towed vehicle in order to couple the two together.

21 Claims, 5 Drawing Sheets

LATERALLY AND LONGITUDINALLY ADJUSTABLE HITCH COUPLING DEVICE

The present invention generally relates to vehicle hitch mechanisms and more particularly to an improved trailer hitch mechanism that is particularly adapted to facilitate easy coupling of a towed vehicle to a towing vehicle.

There have been many types of hitch assemblies developed over many decades, one type of which attaches to the undercarriage of a towing vehicle and includes a ball hitch over which a trailer hitch of a towed vehicle may be connected. Many of such hitch assemblies include a conventional receiver structure that is mounted to the towing vehicle by bolting it to the frame of the truck or other motor vehicle. Such conventional receiver structures have a generally square recess that is adapted to receive an insertion member on which a ball hitch is typically attached. If the operator of the towing vehicle does not wish to tow a trailer or the like, he can remove the receiver insertion member by removing a pin and sliding the insertion member with the ball hitch attached out of the receiver structure.

Typical receiver structures are fabricated from square tubing or the like which has a wall thickness that is sufficient to give the necessary strength to tow trailers and the like for which the hitch is designed to carry. When an operator wishes to couple a towed vehicle such as a trailer to the hitch that is inserted into the receiver structure, he must back-up the towing vehicle to the hitch of the trailer close enough that the hitch of the trailer can be dropped down onto the ball hitch with a minimum of movement and be locked in place. It is commonly known that it is sometimes difficult to obtain such exact alignment and be able to easily drop the hitch onto the ball. It is particularly difficult if the trailer is quite heavy and cannot be easily lifted and rolled into place. While many hitch assemblies have some longitudinal and lateral play of movement, it is still often difficult to accomplish the coupling easily and without significant exertion.

Accordingly, it is a primary object of the present invention to provide an improved coupling device for attaching a towed vehicle to a towing vehicle whereby the attachment can be relatively easily accomplished without requiring undue exertion and exact positioning of the towing vehicle.

Another object of the present invention is to provide such an improved coupling device which is adapted to be used with receiver structures that are commonly used.

Yet another object of the present invention is to provide such an improved coupling device which is longitudinally extendable and laterally adjustable so that exact positioning of the towing vehicle relative to the towed vehicle hitch is unnecessary, thereby facilitating easy coupling of the two vehicles.

Still another object of the present invention lies in the provision for easily retracting the extendable coupling device after the coupling has been made and locking the coupling device in its preferred operating position.

Yet another object of the present invention is to provide such an improved coupling device which is extendable and, which by reason of its design, includes roller means for providing easy extension and retraction of components thereof during the coupling process, but which does not apply stress forces to the rollers after coupling has been completed.

Still another object of the present invention is to provide such an improved coupling device which is fabricated from commonly available materials to produce a strong, reliable and compact product.

These and other objects will become apparent upon reading the following detailed description, while referring to the attached drawings, in which:

DETAILED DESCRIPTION

Broadly stated, the present invention is directed to a coupling device which is adapted to couple a towed vehicle such as a trailer to a towing vehicle such as a truck. The coupling device is designed to be used with many conventional receiver structures that are mounted to towing vehicles, the receiver structures being of the type that normally receive an elongated square insertion member which carries a ball hitch. The coupling device of the present invention is adapted to be inserted into the same receiver structure and is designed to carry a ball hitch, but the coupling device has many advantages over the conventional receiver insertion member because it is extendable in a longitudinal as well as lateral direction so that the towing vehicle does not have to be perfectly aligned with the hitch of the towed vehicle in order to couple the two together.

The extendability results from the hitch assembly that is movable relative to a receiver assembly that is designed to be installed by inserting a portion of the same into the conventional receiver structure. The extendability of the hitch assembly in both the longitudinal and lateral directions enables easy coupling of the towed vehicle to the towing vehicle and once the bitch of the towed vehicle is on the ball hitch of the coupling device, the operator of the towing vehicle can manipulate the coupling device to its preferred operating position by merely moving the towing vehicle toward the towed vehicle until the hitch assembly is retracted relative to the receiver assembly and then moving in the opposite direction in order to adjust the lateral movement to its desired operating position. The lateral adjustability is accomplished by having a tongue member that is pivotable about an axis with the ball hitch being attached to the outer end of the tongue member. The desired operating position for the tongue member is that it be aligned with the longitudinal axis of the hitch assembly, and once such alignment is achieved, locking mechanisms automatically lock the tongue member in its proper angular operating orientation and lock the hitch assembly in its retracted preferred operating position.

Figure 1:
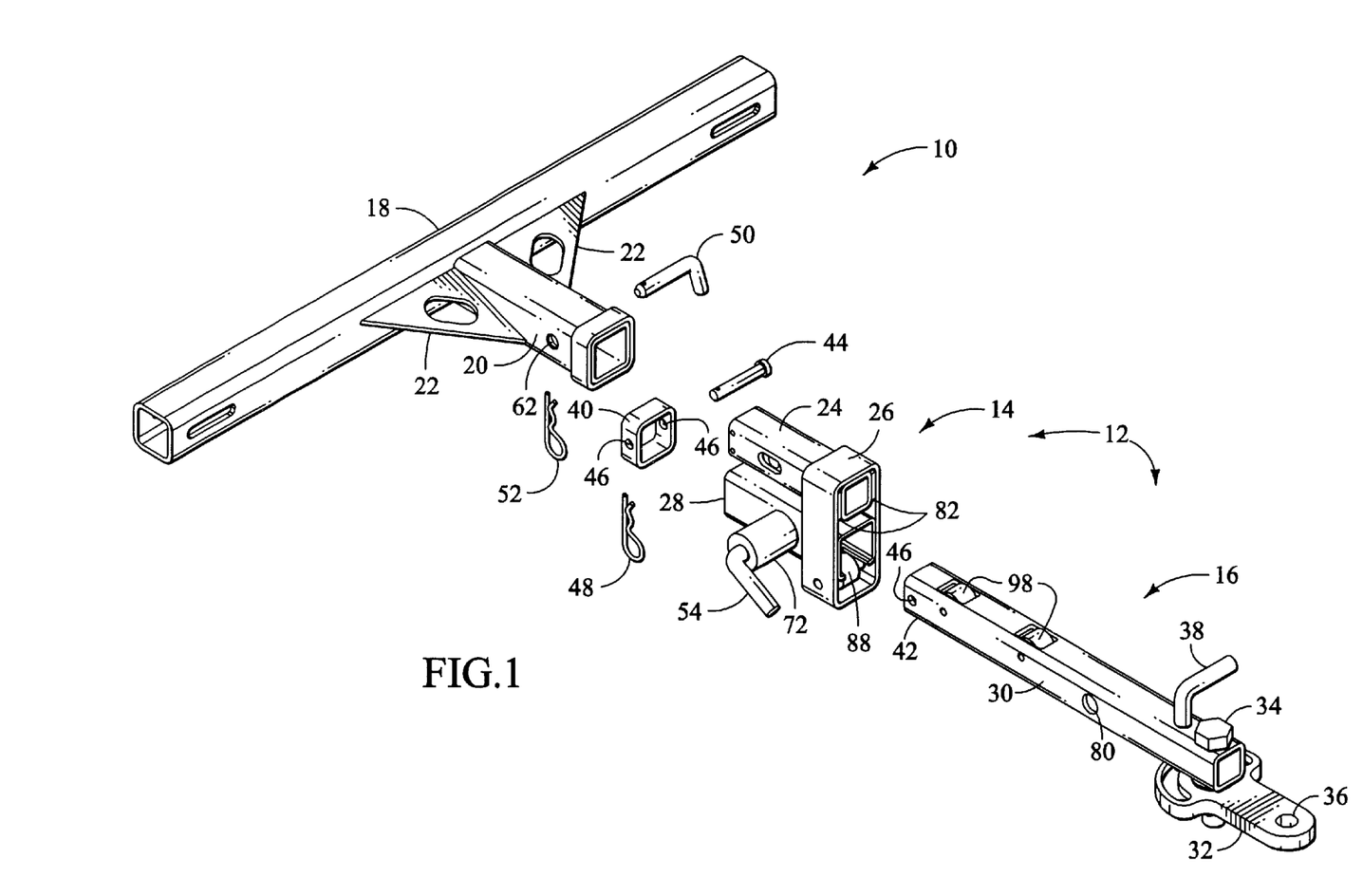
FIG. 1 is a partially exploded perspective view of the coupling device embodying the present invention, together with a conventional receiver structure that is attached to the undercarriage or frame of a towing vehicle.

Turning now to the drawings and particularly FIG. 1, the receiver structure is indicated generally at 10, while the coupling device embodying the present invention is indicated generally at 12. The coupling device 12 comprises two general components, a receiver assembly, indicated generally at 14, and a hitch assembly, indicated generally at 16. Referring to the receiver structure 10, it has a long square tube 18 and a transverse square tube 20 that is attached together, with reinforcing webs 22 being provided for strength. The square tube 18 is preferably bolted to the undercarriage, typically the frame of a truck, automobile or the like and the square tube 20 is adapted to the receive insertion member of a hitch. The square tubes 18 and 20, as well as the web portion 22, are preferably welded together and are preferably made of steel. The square tubes 18 and 20 are preferably 2½"×2½" having a wall thickness of 0.188 inch.

While many of the components herein have been and/or will be described as being comprised of square tubing, it should be understood that the preferred embodiment utilizes such square tubing, but other structural members could be used, such as other boxlike extrusions, angled extrusions or angled members which could be welded or otherwise coupled together. Several of the components could be made of cylindrical stock and certainly the precise squareness of the square tubing could be replaced by a tubing or extrusion that has a rectangular cross-sectional shape.

The receiver assembly 14 comprises a receiver insertion member 24 that is attached to a connecting bracket 26 which also is attached to a hitch housing 28 that is spaced apart from the receiver insertion member 24 but is preferably parallel to it. The member 24 is adapted to be inserted into the square tube 20 of the receiver structure 10 when the coupling device 12 is installed. In this regard, the insertion member 24 is preferably 2"×2" square tube with the hitch housing 28 preferably being 2½"×2½" square tube.

The hitch assembly 16 is comprised of an elongated hitch member 30 that is preferably 2"×2" square tube and the hitch member has a tongue member 32 attached at its outer end by bolt 34. The outer end of the tongue member 32 has an aperture 36 for receiving the stem of a ball hitch of conventional design. Such ball hitches are usually secured with a nut that is threaded onto the stem of the ball hitch structure. The tongue member 32 is rotatable around the bolt 34 and can be rotated in either direction from the position shown, which is the preferred towing position. In this regard, a locking lever 38 is adapted to lock the tongue member 32 in its preferred operating or towing position.

The hitch assembly is attached to the receiver assembly by inserting the hitch member 30 into the hitch housing 28. Once it is inserted, either during the manufacturing process or by the operator, the collar stop 40 is attached to the leftward end 42 of the hitch member 30 and a pin 44 is passed through apertures 46 in the collar stop 40 and in the opposite sides of the end 42 of the hitch member 30. A removable key 48 can be attached to the pin 44 through an aperture therein to hold the pin in place. The collar stop 40 prevents the hitch member 30 from being removed from the hitch housing 28 for the reason that the collar stop is preferably 2½"×2½" square tubing which is the same size as the square tubing of the hitch housing 28. A pin 50 and locking key 52 are used to lock the receiver assembly when it is attached to the receiver structure. A bitch lock lever 54 is adapted to lock the hitch member 30 to the receiver assembly after it has been inserted into its operating position.

The receiver assembly 14 is attached to the receiver structure 10 in a manner whereby minor cushioned movement between the two is permitting. Referring to the more detailed exploded perspective view of FIG. 2, the insertion member 24 has a pair of elongated slots 56, only one of which can be seen, in opposite sidewalls. A slide block 58 is positioned inside of the insertion member 24 and it has an aperture 60 appropriately sized to receive the locking pin 50 which extends through aperture 60. There are apertures 62 on both sides of the square tube 20 and the pin 50 is adapted to pass through the aperture 62, the slots 56 and the aperture 60 in the slide block 58 to hold the receiver assembly 14 attached to the receiver structure 10.

Figure 2:
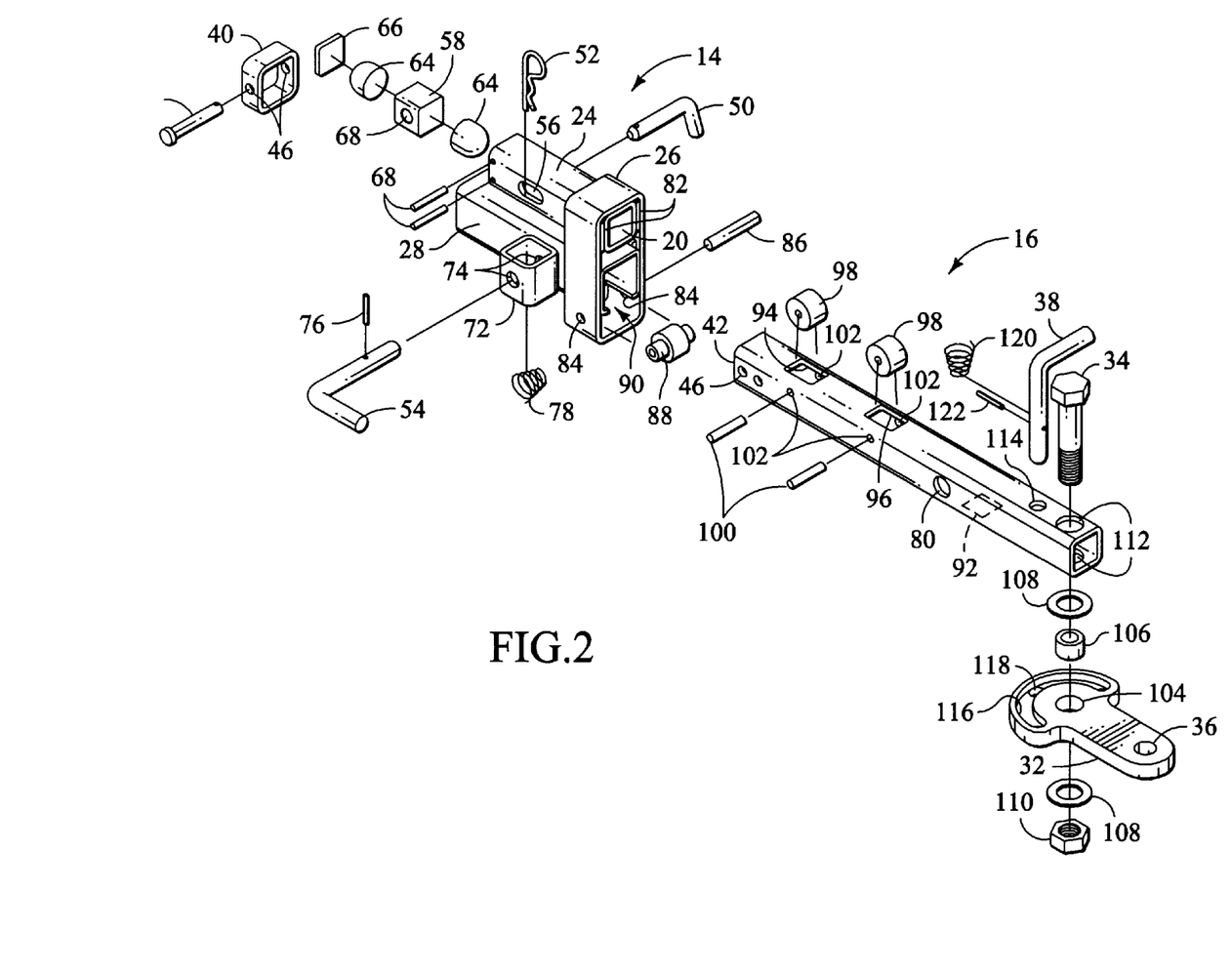
FIG. 2 is an exploded perspective of the coupling device embodying the present invention.

On opposite sides of the slide block in the insertion member 24 are a pair of cushions 64 which are preferably made of polyurethane material and are sized to have a diameter that is approximately equal to the inside cross-sectional area of the insertion member 24. The outer ends of the cushion 64 are hemispherically shaped so that the cushions have a generally bullet shaped volume. Cushion stop plate 66 is placed inside the square tube insertion member 24 and stop pins 68 fit within appropriate apertures to hold the stop plate 66 in the insertion member 24. Another plug member 70 is provided in the opposite end of the insertion member 24 and has a length that is sufficient to contact the cushion 64 and to appropriately center the slide block 58 in the slot 56 when forces are not applied to the receiver assembly in a direction to compress either of the cushions 64.

The receiver assembly has a holding collar 72 which is preferably a short piece of 2"×2" square tube that has apertures 74 therein that are sized to receive the hitch lock lever 54 therein. The hitch lock 54 is inserted into the locking collar 72 and a pin 76 is inserted on the interior of the collar 72 to hold the locking lever 54 in place. A spring 78 is applied around the lever 54 with one end impinging the inside wall and the opposite end of the spring impinging upon the pin 76. With the spring being in compression, its right end will impinge upon the pin 76 and its left end as shown will impinge upon the left inside surface of the collar 74 and urge the lever 54 to the right or toward the hitch housing 28. The hitch housing also has a coextensive aperture 74 so that the lever 54 is adapted to engage an aperture 80 in the hitch member 30 when it is fully inserted as desired. If it is later to be extended during a coupling operation, the operator merely needs to pull the lock lever 54 so that it disengages the aperture 80 in the hitch member and the hitch member can then be pulled to the right as shown to extend the same relative to the receiver assembly 14.

The connecting bracket 26 is elongated in the vertical direction and has an internal width that is adapted to contact the outside surface of the hitch housing square tube 28. Because it is of this width, a pair of spacer strips 82 are provided on each side of the insertion member 24. The strips and square tubes 24 and 28 are preferably welded to the connecting bracket 26 in a conventional manner. At the bottom of the bracket are a pair of apertures 84 which are adapted to receive a roller axle 86 which carries a roller 88 that is sized so that its outer reach extends beyond the plane of the inside of the bottom wall of the insertion member 28. A square opening, indicated generally at 90, is formed by removing material from the bottom wall of the hitch housing square tube 28. The roller 88 located at this position facilitates easy insertion of the hitch member 30 which the roller 88 contacts when the hitch assembly 16 is inserted into the receiver assembly 14. It should be appreciated that another opening 82 is provided in the bottom wall of the hitch member 30 so that when it is fully inserted, i.e., the lock lever 54 fits into the hole 80, the roller 88 will be positioned at the opening 92 so that no force will be applied to the roller while it is in its preferred operating position.

Figure 3:
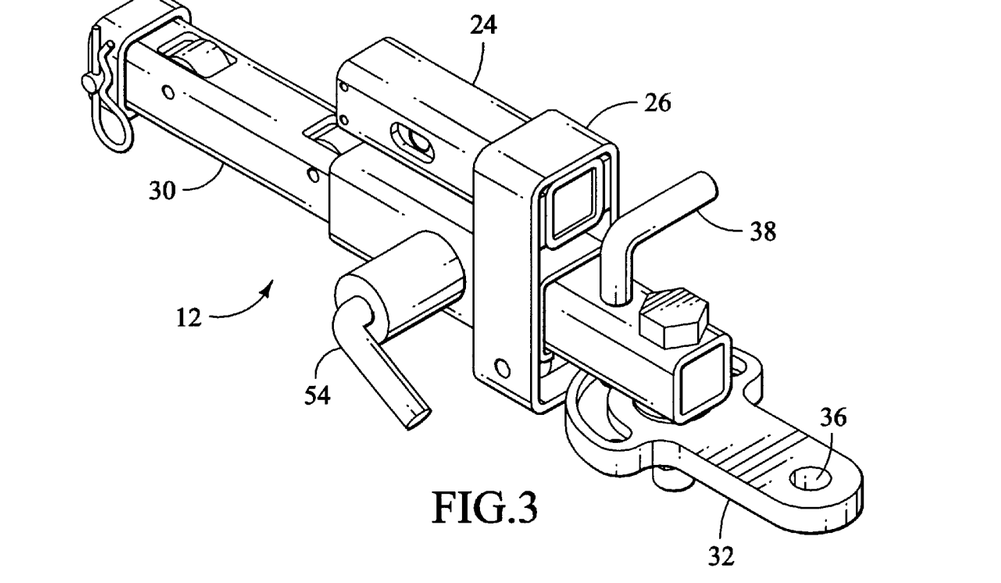
FIG. 3 is a perspective view of the coupling device embodying the present invention shown in its preferred operating position.

To further facilitate easy insertion, the hitch member 30 also has a pair of openings 94 and 96 in its upper surface, with rollers 98 being located therein, and being carried by roller axles 100 which fit within suitable apertures 102 in the sidewalls thereof. It should be appreciated that when the hitch member is fully inserted to its operating position, the rollers 98 are not in contact with the inside surface of the housing 28, inasmuch as they extend beyond the end of the hitch housing 28, as shown in FIG. 3.

The tongue member 32 has an aperture 104 in which a tongue bushing 106 is placed and a pair of washers 108 are provided as is a tongue nut 110 that connects to the tongue bolt 34. The tongue bolt 34 extends through an apertures 112 in the upper and lower surfaces of the hitch member 30. The net result is that the tongue member 32 is able to rotate from side to side as is desired. The tongue lock lever 38 fits within upper and lower apertures 114 in the hitch member 30 and it has a length sufficient to extend into a semicircular recess 116 located in the top of the tongue member 32. The recess 116 and a hole 118 is provided in the recess 116 in the center position which is the preferred towing position. The tongue lock lever 38 is adapted to fit within the recess 116 and it can be rotated approximately 180°, i.e., 90° in each direction, with the lever 38 being adapted to extend into the aperture 118 to lock it in place during towing.

The lever 38 is biased in the downward direction as shown by a spring 120 that bears against the inside upper surface of the hitch member 30 and against a pin 122 that is inserted into an aperture in the lever 38. The compression spring 120 biases the lock lever toward engagement with the tongue member 30.

Figure 4:
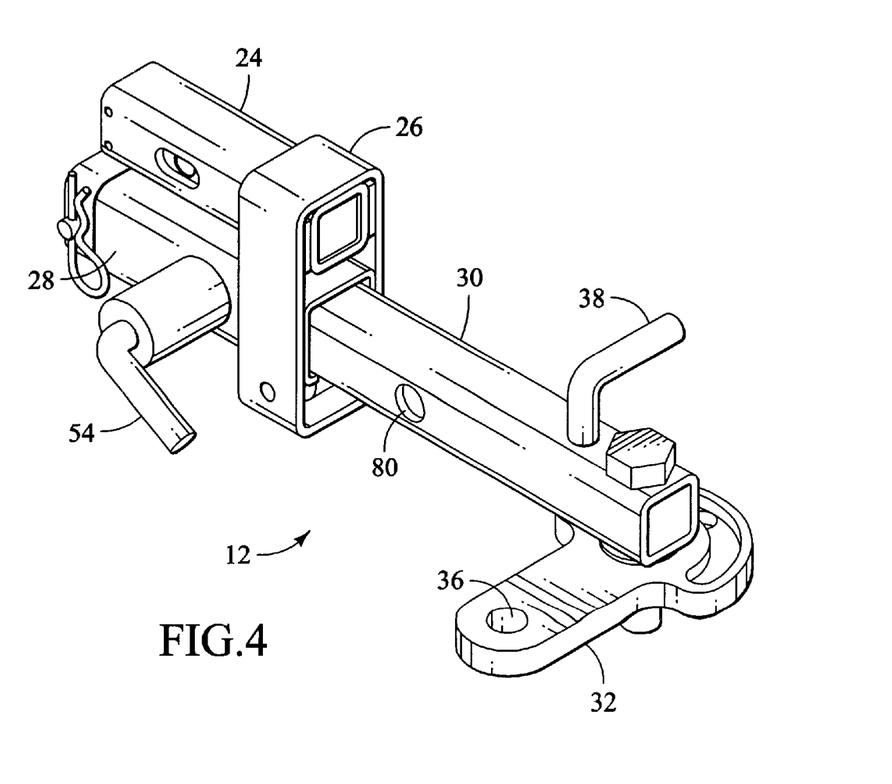
FIG. 4 is a perspective view of the coupling device embodying the present invention shown in an extended position with its tongue member rotated in a first direction.
Figure 5:
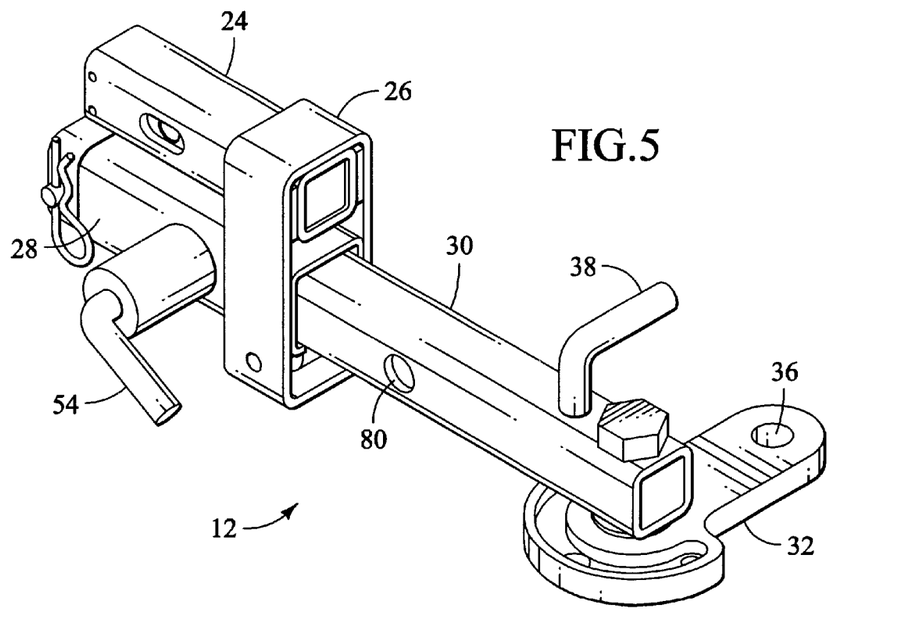
FIG. 5 is a perspective view of the coupling device embodying the present invention shown in an extended position with its tongue member rotated in a second direction.
Figure 6:
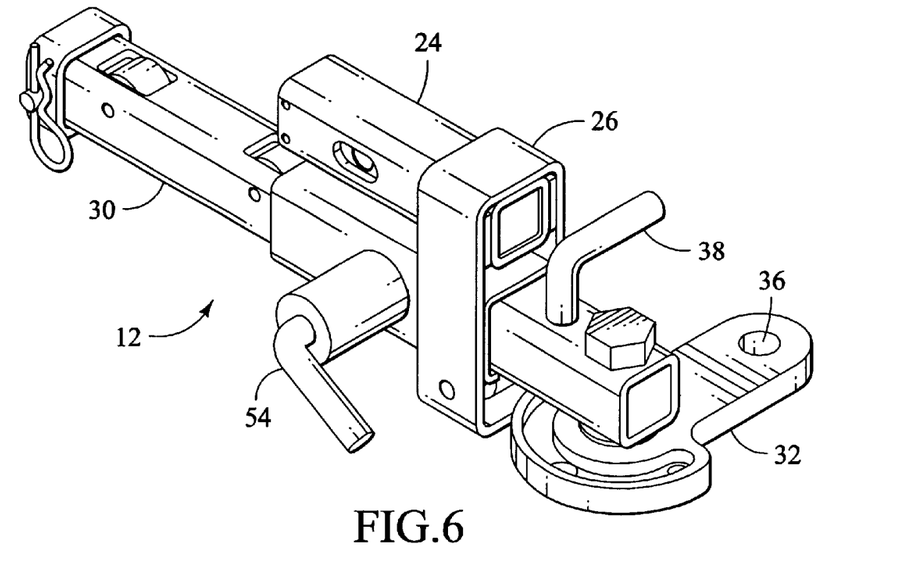
FIG. 6 is a perspective view of the coupling device embodying the present invention shown in its retracted position with the tongue member rotated in the second position; and, FIG. 7 is a perspective view of the coupling device embodying the present invention shown in its extended position with the tongue member in its preferable operating position.
Figure 7:
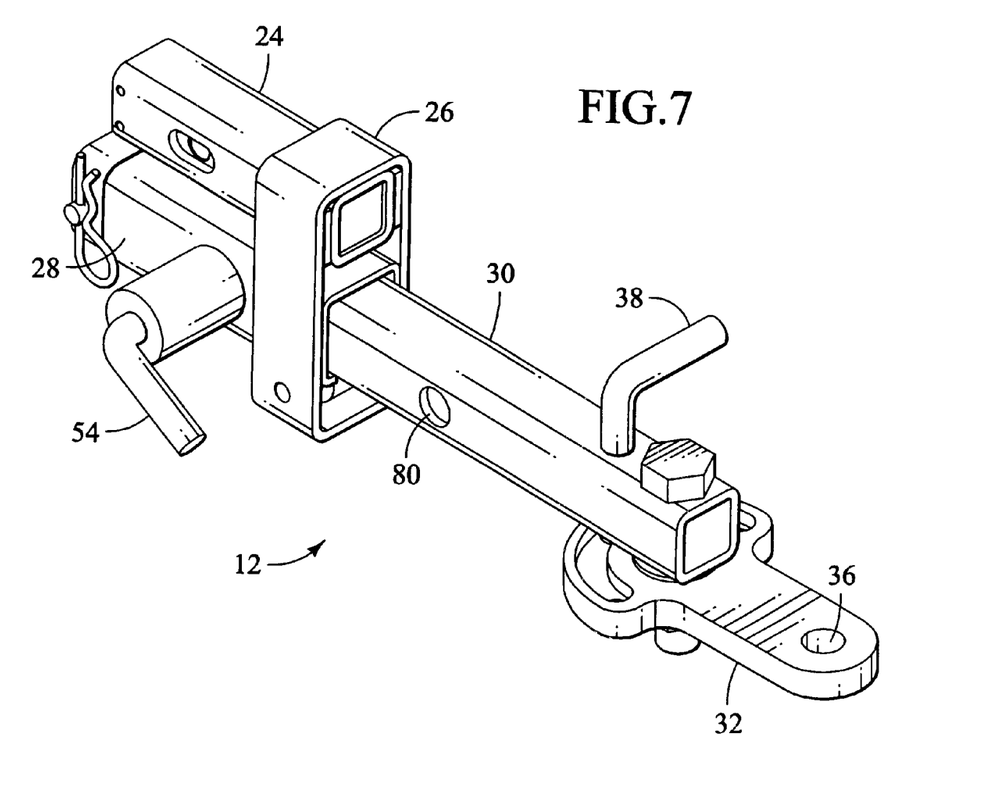

When the hitch assembly is in its extended position relative to the receiver assembly, that represents the reach in the longitudinal direction that can be achieved by sliding the hitch member out of the hitch housing 28 as shown in FIGS. 4, 5 and 7. The tongue member 32 can be rotated 90° in a clockwise position as viewed from the top as shown in FIG. 4 or in the counterclockwise direction as shown in FIGS. 5 and 6. Thus, the coupling of a towed device can be done by placing the towing vehicle in a relatively close position, which may not perfect, and the combination of extending the hitch member 30 and rotating the tongue member 32 enables the ball hitch (installed in aperture 36) to be optimally positioned so that the towed vehicle hitch can be dropped onto the ball hitch. After that is done, the towing vehicle can be backed up to push the receiver assembly and hitch assembly together, whereupon the lock lever 54 will lock into the aperture 80. If the tongue member is not in its preferred towing position such as that shown in FIGS. 3 and 7, the operator can drive the towing vehicle forward and the resistance of the towed vehicle will be sufficient to pull it into a straight aligned position as shown in FIGS. 3 and 7 whereupon the tongue lock lever 38 will be biased into engagement to lock it in its preferred towing position.

From the foregoing, it should be appreciated that an improved coupling device has been shown and described which offers the advantages of being longitudinally as well as laterally adjustable so that it can be optimally positioned during the coupling process and thereby minimizes the exertion that is typically required in placing a towed vehicle hitch onto a hitch ball of a towing vehicle.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A coupling device for attaching a towed vehicle to a towing vehicle, the towing vehicle having a receiver structure mounted thereto, the receiver structure having an elongated square tube with an internal recess adapted to receive a cooperating hitch structure therein, said coupling device comprising:

a receiver assembly for removably securing said coupling device to the receiver structure mounted to the towing vehicle;

an elongated hitch assembly attached to said receiver assembly and having an outer end portion; and, a tongue member having a first end portion attached to said outer end portion of said hitch assembly and being generally horizontally pivotable relative thereto, said tongue member having a second end portion adapted to have a ball hitch means attached thereto;

said receiver assembly further comprising:

an elongated receiver insertion member adapted to be slidably inserted into the square recess of the receiver structure;

an elongated hitch housing adapted to slidably receive at least a portion of said hitch assembly therein, said hitch housing having a hitch locking means for locking said hitch assembly thereto;

a connecting bracket connecting said hitch housing to said receiver insertion member whereby said hitch housing and receiver insertion member are substantially parallel to, but are spaced apart from one an other.

2. The coupling device as defined in claim 1 wherein the receiver structure has an aperture in opposite side walls of said square tube and said insertion member has a hollow interior and an elongated slot on opposite sides thereof, said aperture in the side walls being coextensive with the center portion of the insertion member elongated slot when the insertion member is inserted in said recess, said coupling device having a main pin that is adapted to fit within said elongated slots and said apertures to hold said coupling device in said receiver insertion structure.

3. The coupling device as defined in claim 2 wherein said insertion member further comprises:

front and rear stop plates respectively located at opposite end portions of said insertion member, with said elongated slots being located between said stop plates;

a slide block located within said receiver insertion member and being adapted to slide therein, said slide block having an aperture with a diameter smaller than the width of said elongated slots and being coextensive therewith;

a first cushion member positioned between said slide block and said rear stop plate;

a second cushion member positioned between said slide block and a front stop plate;

said main pin passing through said slots, said receiver structure apertures and said slide block aperture to thereby attach said receiver insertion member in said receiver structure and permit limited relative movement between the same along said slots while compressing one of said cushion members depending upon the direction of movement of said receiver insertion member relative to said receiver structure.

4. The coupling device as defined in claim 3 wherein said main pin has a releasable locking means adapted to prevent removal of said main pin from said slots, said receiver structure apertures and said slide block aperture.

5. The coupling device as defined in claim 3 wherein each of said first and second cushion members is generally bullet-shaped with a hemispherical portion contacting said rear stop plate.

6. The coupling device as defined in claim 5 wherein said first and second cushion members are fabricated from a polyurethane material.

7. The coupling device as defined in claim 1 wherein said ball hitch means comprises a ball with a post attached thereto, the second end portion having an aperture therein through which said post can be inserted, said hitch means having fastening means operatively attachable to said post for securing said hitch means to said second end portion of said tongue member.

8. The coupling device as defined in claim 1 wherein said hitch assembly comprises:
   an elongated hollow generally square tube having a tongue aperture and a tongue lock aperture in said outer end portion;
   connecting means operatively positioned in said tongue aperture and being attached to said tongue member, whereby said tongue member is rotatable relative to said square tube;
   a tongue locking lever operatively positioned in said tongue lock aperture and adapted to releaseably engage said tongue member to lock the same at a predetermined pivotal position.

9. The coupling device as defined in claim 8 further including a first biasing means is operatively associated with said square tube and said tongue locking lever for biasing said lever toward locking engagement with said tongue member when the same is located in said predetermined pivotal position.

10. The coupling device as defined in claim 9 wherein said first biasing means comprised a compression spring located in said square tube having one end bearing against the inside wall of the top thereof, said locking lever having a transverse extension for engaging the opposite end of said compression spring.

11. The coupling device as defined in claim 8 wherein said tongue member has a generally semicircular recess in the upper surface thereof adapted to receive said tongue locking lever, said tongue member also having an aperture in said recess adapted to receive the end portion of said tongue locking lever to lock the tongue member in said predetermined position.

12. The coupling device as defined in claim 8 wherein said hitch assembly square tube and said hitch housing each have a locking aperture in at least one side wall thereof adapted to receive a portion of a lock lever, said receiver assembly having a hitch locking lever operatively connected to said hitch housing and adapted to be inserted into said hitch locking lever aperture in said hitch housing and said hitch assembly square tube to hold said hitch assembly in place.

13. The coupling device as defined in claim 12 wherein said receiver assembly further comprises biasing means for biasing said hitch locking lever toward said insertion into said hitch locking lever aperture.

14. The coupling device as defined in claim 8 wherein said hitch housing comprises an elongated square tube having an interior dimension larger than the outer dimension of said hitch assembly square tube so that the latter can be inserted into the hitch housing square tube, said hitch housing square tube having an opening in its bottom wall at the location of said connecting bracket, said connecting bracket having a portion that extends below said square tube thereby forming a volume therein, a roller mounted on an axle that is mounted to said connecting bracket such that the outer surface of the roller extends a small distance into the interior of the square tube so that the bottom surface of said hitch assembly square tube can ride on said roller during insertion.

15. The coupling device as defined in claim 14 wherein the bottom surface of said hitch assembly square tube has an opening near said outer end portion so that said bottom surface is out of contact with said roller when said hitch assembly is fully inserted into said receiver assembly.

16. The coupling device as defined in claim 14 wherein said hitch assembly square tube includes at least two roller openings in the top wall thereof, and a roller for each roller opening, each roller being mounted inside said square tube and having its surface extending beyond the outer surface of the square tube so that said rollers can ride on the inside of the top wall of said hitch housing during insertion of said hitch assembly into said receiver assembly.

17. The coupling device as defined in claim 16 wherein the length of said hitch assembly square tube is greater than the length of said hitch housing square tube so that a portion of said hitch assembly square tube extends beyond the end of said hitch housing square tube, said roller openings being located in said portion extending beyond the end of said hitch housing square tube.

18. The coupling device as defined in claim 17 wherein said hitch assembly includes a removable stop means attached generally at the outer end of said end portion of said hitch assembly square tube, said stop means preventing said hitch assembly square tube from being removed from said hitch housing when said stop means is in place.

19. A coupling device for attaching a towed vehicle to a towing vehicle, the towing vehicle having a receiver structure mounted thereto, the receiver structure having an elongated hollow square tube adapted to receive a cooperating hitch structure therein, said coupling device comprising:
   a receiver assembly having a square tube that is adapted to be inserted into said receiver structure square tube, and having a cushioned locking means for removably securing said coupling device to the receiver structure, said receiver assembly including a hitch housing hollow square tube;
   an elongated hitch assembly including an elongated hitch member square tube appropriately sized to be inserted into said hitch housing hollow square tube, said hitch assembly having an outer end portion; and,
   a tongue member having a first end portion attached to said outer end portion of said hitch assembly and being generally horizontally pivotally mounted thereto, said tongue member having a second end portion adapted to have a ball hitch means attached thereto.

20. A coupling device as defined in claim 19 further comprising locking means for releasably locking said tongue member in a predetermined angular position relative to said hitch assembly.

21. A coupling device as defined in claim 19 wherein at least one of said receiver assembly square tube and said hitch assembly square tube have at least one roller which is mounted therewithin and which extends through the outer wall thereof adapted to contact the other square tube during insertion of said hitch assembly square tube into said receiver assembly square tube.

* * * * *

UNITED STATES PATENT AND TRADEMARK OFFICE
CERTIFICATE OF CORRECTION

PATENT NO.    : 6,502,845 B1
DATED         : January 7, 2003
INVENTOR(S)   : Robert D. Van Vleet

It is certified that error appears in the above-identified patent and that said Letters Patent is hereby corrected as shown below:

Column 2,
Line 48, delete "bitch" and insert -- hitch --.

Column 3,
Line 61, delete "bitch" and insert -- hitch --.

Signed and Sealed this

Nineteenth Day of August, 2003

JAMES E. ROGAN
*Director of the United States Patent and Trademark Office*